J. D. SMITH.
Mower.

No. 23,869.

2 Sheets—Sheet 1.

Patented May 3, 1859.

Witnesses:

Inventor:

J. D. Smith.
Mower.

No 23869. Patented May 3, 1859.

Witnesses.

Inventor.
J. D. Smith

UNITED STATES PATENT OFFICE.

JOSEPH D. SMITH, OF LANCASTER, OHIO.

IMPROVEMENT IN HARVESTING-MACHINES.

Specification forming part of Letters Patent No. 23,869, dated May 3, 1859.

*To all whom it may concern:*

Be it known that I, JOSEPH D. SMITH, of Lancaster, in the county of Fairfield and State of Ohio, have invented a new and useful Improvement in Reaping and Mowing Machines; and I do hereby declare that the following is a full, clear, and exact description of the same, reference being had to the accompanying drawings, forming a part of this specification, in which—

Figure 1:
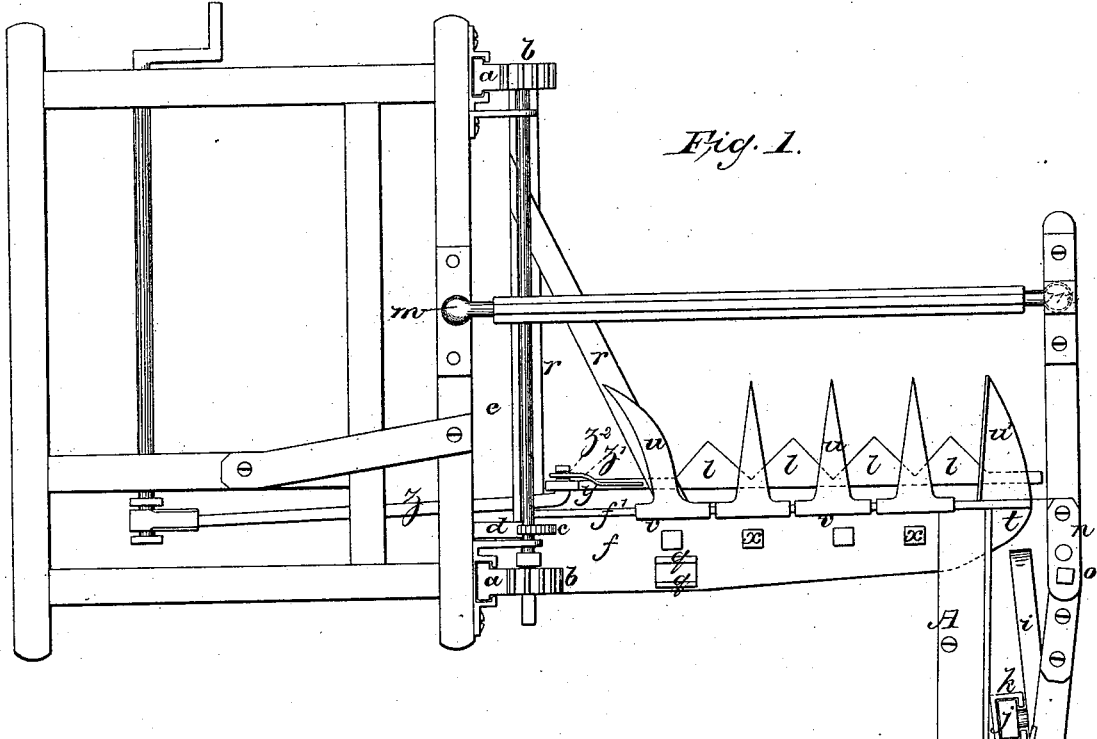
Figure 3:
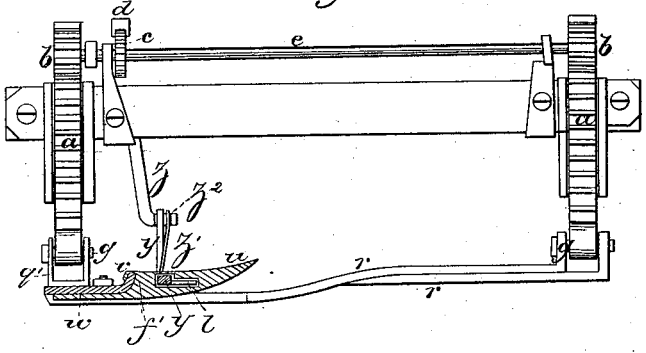
Figure 2:
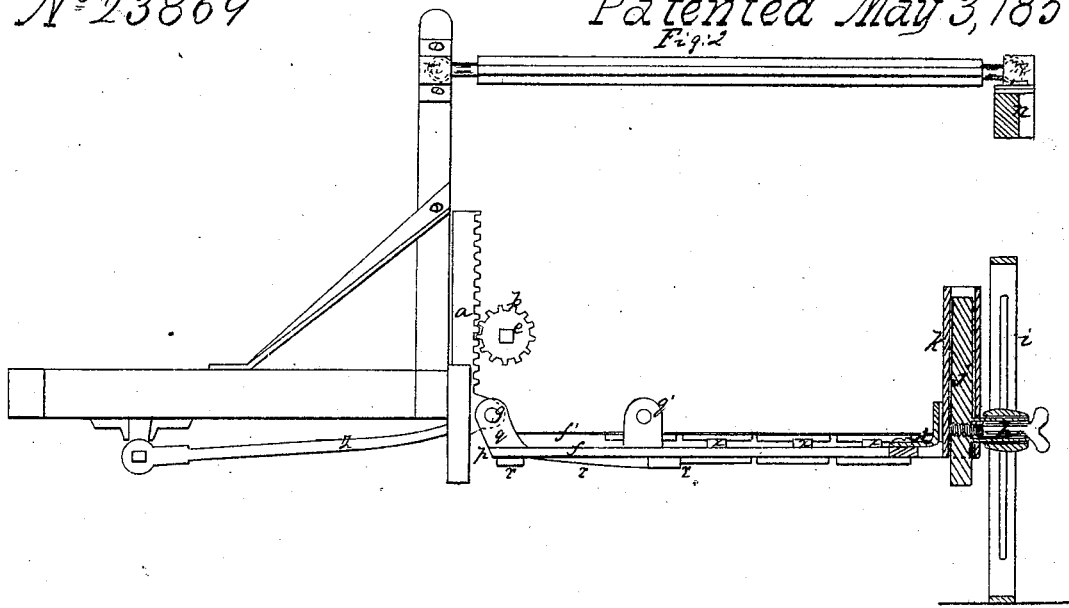
Figure 4:
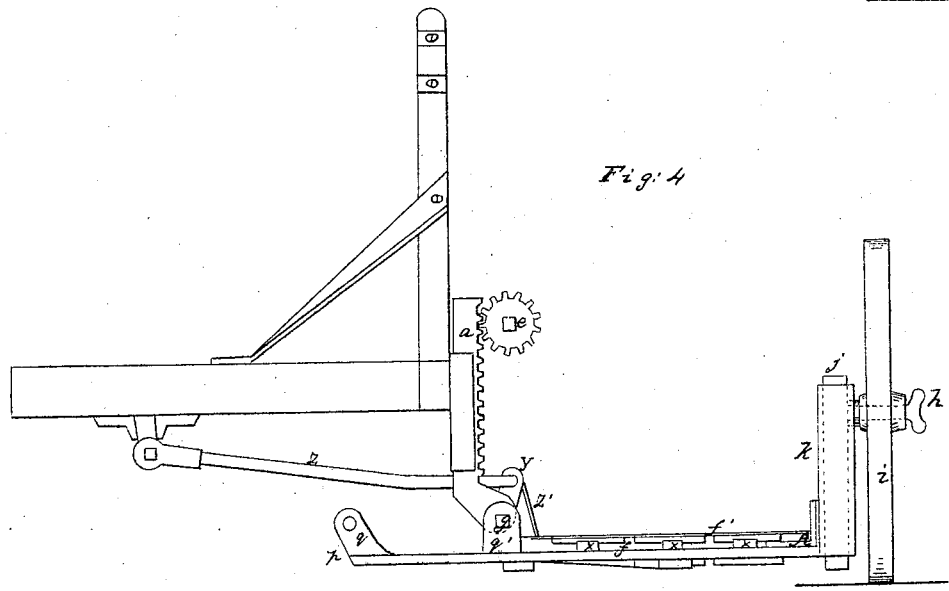

Figure 1 is a plan or top view of my machine as a reaper. Fig. 2 is a rear view of the same partly in elevation and partly in section. Fig. 3 is a vertical transverse section of the machine as a mower, looking toward the near side of the platform. Fig. 4 is a rear view of the same.

My invention relates to certain improvements in the arrangement of the mechanism for connecting the cutting apparatus with the main frame of the machine, which admits of the vertical adjustment of the cutting apparatus in a horizontal plane; also, in certain other provisions for a more perfect organization of the machine, which will be hereinafter described.

To enable others skilled in the art to make and use my invention, I will describe its construction and operation.

In the construction of my machine I employ a main frame with the usual driving gear, and attach the cutting apparatus laterally thereto; but these parts are familiar, and therefore will not require a more full description here.

I connect the cutting apparatus by hinge-joints $g\ g$ to the bottom ends of vertical rack-bars $a\ a$, which are provided with sockets, in which they slide, secured to the main frame. Two brackets project from the main frame, one near the rear and one near the front. They support a shaft, $e$. This shaft is provided with two pinions and a ratchet-wheel, $c$, into the latter of which a pawl, $d$, works. By this shaft and pinions the rack-bars are elevated or depressed, and thereby caused to raise or lower the cutting apparatus at its inner end. The outer side of the cutting apparatus is provided with an adjustable wheel, by which a similar adjustment to that just described can be effected at this point. This wheel is of ordinary construction, and arranged in the usual way, and therefore need not be further described.

I provide the reel-shaft with ball-shaped journals $m\ m$, and have said journals turn in boxes provided with spherical sockets. I also form a joint, $o$, in the off-side timber $n$ of the reel-frame. The ball-joints, in connection with the horizontal turning timber $n$, allow the reel a chance to accommodate itself to any upward or downward deflection of the sickle-bar on its joints $g\ g$ without having its revolution interfered with.

I likewise provide on the near side $p$ of the sickle-bar $f$ a secondary standard, $q'$, and on the main frame side braces, $r\ r'$, the brace $r$ being hinged so as to be adjustable laterally, as shown in the drawings. The secondary standard $q'$ and hinged brace $r'$ admit of the machine being readily converted from a reaper into a mower in the following manner: Take off a portion of the sickle-teeth and move the points of connection of the braces $r\ r'$ toward the off side $t$ of the sickle-bar, so as to have the near end of the sickle-bar extend under the main frame, as shown in Fig. 4. This being done, hinge the sickle-bar at $q'$ and adjust the brace $r'$ laterally on its hinge, so that its attaching-hole will come in line with one of the holes which receive the sickle-teeth bolts $x$. The machine thus changed will answer admirably for mowing. It is essential to thus change the machine, as a short stiff cutter can be employed, which character of cutter is better adapted, by reason of its shortness and consequent stiffness, to the cutting of thick-bottom substances—such as grass—than is a long flexible cutter, such as is used while reaping.

I further provide an overhanging upper lip, $v$, and an under back extension flange, $w$, on each of the sickle guards or teeth $u$, and attach the guards to a sickle-bar, $f$, which has an upwardly-curving edge, $f'$. The teeth or guards thus constructed will only require a single bolt, $x$, to securely confine each of them in place, as the lip of the tooth or guard serves as an auxiliary fastening and support to said bolt, it tending to relieve the bolt when lateral or downward pull comes upon the tooth or guard, and throw the strain upon the upward curved edge of the sickle-bar, and thus, instead of allowing the tooth to become loose or detached from the sickle-bar, causing it to take a more firm hold.

I further provide a spring-catch, $z'$, on the sickle-back $y$, and a notch, $z^2$, in the pitman $z$. The spring-catch and notch afford great convenience in attaching and detaching the pitman from the sickle or cutter back when it is desired to convert the machine from a reaper into a mower, and, what is more important, they dispense with the use of a detached nut or linchpin, which is liable to get lost, for effecting the connection of the pitman and sickle-bar.

What I claim as my invention, and desire to secure by Letters Patent, is—

1. The arrangement of the mechanism for adjusting the cutting apparatus, consisting of the rack-bars $a\ a$, hinged to the cutting apparatus, shaft $e$, provided with pinions $b\ b$, and ratchet-wheel and pawl $c\ d$, when employed in combination with the adjustable wheel $i$, in the manner and for the purpose specified.

2. The employment of the ball-journals $m\ m$ of the reel-shaft, in combination with the off-side horizontally-turning timber $n$ of the reel-frame, substantially as and for the purposes set forth.

3. The combination of the secondary standard $q'$, arranged on the sickle-bar, with the hinged laterally-adjustable brace $r'$, in the manner herein described, and for the purpose set forth.

4. The combination, with the upward curved edge $f'$ of the sickle-bar $f$, of the overhanging upper lip, $v$, and the under back extension flange, $w$, of the sickle guard or tooth $u$, in the manner and for the purpose set forth.

5. The spring-catch $z'$, arranged on the sickle-back $y$, in combination with the stop-notch $z^2$, formed in the pitman $z$, for the purpose of fastening the sickle or cutter back $y$ to the pitman $z$, in the manner set forth.

J. D. SMITH.

Witnesses;
 G. YORKE ATLEE,
 D. F. LEE.